(12) United States Patent
De La Cruz et al.

(10) Patent No.: US 9,674,433 B1
(45) Date of Patent: Jun. 6, 2017

(54) IMAGE CENTER CALIBRATION FOR A QUADRIC PANORAMIC OPTICAL DEVICE

(71) Applicant: VSN TECHNOLOGIES, INC., Fort Lauderdale, FL (US)

(72) Inventors: Moises De La Cruz, Miramar, FL (US); Amit Verma, Sunrise, FL (US); Tal Mor, Coral Springs, FL (US); James Conroy, Pompano Beach, FL (US); William H. Robertson, Jr., Fort Lauderdale, FL (US); John N. Shemelynce, Fort Lauderdale, FL (US)

(73) Assignee: HOYOS VSN CORP., San Juan, PR (US)

( * ) Notice: Subject to any disclaimer, the term of this patent is extended or adjusted under 35 U.S.C. 154(b) by 152 days.

(21) Appl. No.: 14/340,376

(22) Filed: Jul. 24, 2014

(51) Int. Cl.
*H04N 5/232* (2006.01)
*G02B 13/06* (2006.01)
(Continued)

(52) U.S. Cl.
CPC ......... *H04N 5/23238* (2013.01); *G02B 13/06* (2013.01); *G03B 43/00* (2013.01);
(Continued)

(58) Field of Classification Search
CPC ............ H04N 5/23238; H04N 17/002; H04N 1/00045; H04N 2201/0005; G02B 13/06;
(Continued)

(56) References Cited

U.S. PATENT DOCUMENTS 6,870,563 B1 *  3/2005  Kang ...................... G06T 5/006
                                                              348/207.99
7,362,969 B2 *  4/2008  Aliaga .................. G02B 13/06
                                                              348/187
(Continued)

FOREIGN PATENT DOCUMENTS

CN          103646394 A  *  3/2014
CN          103810697 A  *  5/2014
(Continued)

OTHER PUBLICATIONS

Zhang et al.; "Centra catadioptric camera calibration with single image"; Jul. 19-24, 2009; IEEE; 2009 IEEE International Conference on Acoustics, Speech, and Signal Processing; pp. 1253-1256.*
(Continued)

*Primary Examiner* — John Villecco
(74) *Attorney, Agent, or Firm* — Patents on Demand P.A.; Brian K. Buchheit; Scott M. Garrett (57) ABSTRACT

A calibration method can begin by positioning a calibration image source around and substantially proximate to the exterior surface of a panoramic optical device that utilizes a conical quadric reflector having an aperture in its apex. The calibration image source can be made of a material that is substantially transparent to allow the passage of environmental light and can utilize a predetermined color palette having a calibration feature, such as a geometric shape and/or a line, which is in a known location. A quadric image of the calibration image source can then be captured. Coordinates for a visual image center of the calibration image can (Continued)

be determined by an image center calibration program using the location of the calibration feature. The visual image center can be the point around which a quadric image is transformed into a visually-correct panorama. The determined visual image center coordinates can be stored.

20 Claims, 6 Drawing Sheets (51) Int. Cl.
    *H04N 1/00*     (2006.01)
    *G03B 43/00*     (2006.01)
    *H04N 17/00*     (2006.01)

(52) U.S. Cl.
    CPC ....... *H04N 1/00045* (2013.01); *H04N 17/002* (2013.01); *H04N 2201/0005* (2013.01)

(58) Field of Classification Search
    CPC ........ G03B 37/00; G03B 37/06; G03B 43/00; G06T 7/0018
    USPC ..................................... 348/36, 39, 187, 188
    See application file for complete search history.

(56) References Cited

U.S. PATENT DOCUMENTS

| | | | | |
|---|---|---|---|---|
| 7,768,545 B2* | 8/2010 | Glatt | ...................... | G03B 37/00 348/36 |
| 9,250,510 B2* | 2/2016 | Li | .......................... | G03B 37/06 |
| 9,319,666 B1* | 4/2016 | Lisin | .................... | H04N 17/002 |
| 2004/0105597 A1* | 6/2004 | Lelescu | ................. | G06T 7/0018 382/276 |
| 2008/0002023 A1* | 1/2008 | Cutler | ................... | G06T 3/4038 348/36 |
| 2008/0218587 A1* | 9/2008 | Glatt | .................. | G08B 13/1968 348/39 |
| 2012/0081512 A1* | 4/2012 | Shimizu | ............. | G06K 9/00798 348/36 |

FOREIGN PATENT DOCUMENTS

| | | | | |
|---|---|---|---|---|
| DE | 102007049822 A1 * | 5/2008 | ........... | G01B 21/042 |
| DE | 102007049821 A1 * | 4/2009 | ......... | G06K 9/00791 |
| WO | WO 2014106303 A1 * | 7/2014 | ............. | G03B 37/00 |

OTHER PUBLICATIONS

Fabrizio et al.; "Calibration of panoramic catadioptric sensors made easier"; Jun. 2002; IEEE; Third Workshop on Omnidirectional Vision, 2002; pp. 45-52.*

* cited by examiner

Draws three lines from the outer edges of the calibration image to the edge of the aperture void
505

520
Aperture Void 525
522
530

Identifies the coordinate values where each line intersects the edge of the aperture void
510

535
525
522
540
(x,y)

Calculates the coordinates for the center of the aperture void using the identified coordinates and a corresponding set of linear equations
515

545   Let (h,k) be the coordinates for the aperture center. Solve for h and k in the following system of linear equations $$(x_1 - h)^2 + (y_1 - k)^2 = r^2$$
$$(x_2 - h)^2 + (y_2 - k)^2 = r^2$$
$$(x_3 - h)^2 + (y_3 - k)^2 = r^2$$

IMAGE CENTER CALIBRATION FOR A QUADRIC PANORAMIC OPTICAL DEVICE

BACKGROUND

The present invention relates to the panoramic optical device and, more particularly, to image center calibration for a quadric panoramic optical device.

The use of panoramic optical devices (e.g., panoramic cameras) for business and personal pursuits continues to increase. One-shot panoramic optical devices, cameras specifically designed to capture a 360-degree image at one time or shot, are particularly suited for surveillance situations or situations where the panoramic optical device will be permanently installed at a location. As such, newer panoramic optical devices are often designed for extended use.

A longer intended life of the panoramic camera means that it is more likely that the camera will be moved from one location to another and/or parts will need to be replaced. These changes to the actual panoramic camera as well as other environmental stressors like wind and vibration have the potential to alter how the camera captures its images. For example, a misalignment of replaced part will change how light hits an image sensor component, resulting in a visually-incorrect panoramic image. That is, misaligned components of the panoramic camera affect the visual image center that is used to create the final panorama.

Calibrating the visual image center used by the panoramic camera is not an easy task and requires skills that the average user typically does not possess. The expense of the panoramic camera precludes a disposable nature. Therefore, these panoramic optical devices need a fairly simple and substantially automated means for calibrating the visual image center in order to continue to provide visually-correct panoramic images throughout its intended life.

BRIEF SUMMARY

One aspect of the disclosure describes a method for calibrating a panoramic optical device for creating panoramic images. Such a method can begin by positioning a calibration image source around and substantially proximate to the exterior surface of a panoramic optical device. The panoramic optical device can utilize a quadric reflector having a conical shape and an aperture in its apex. The calibration image source can be made of a material that is substantially transparent so as to allow environmental light to pass through the calibration image source and can utilize a predetermined color palette. The surface of the calibration image source that faces the panoramic optical device can include a calibration feature that is a geometric shape and/or a line. The calibration feature can be in a known location within the calibration image source, and, therefore, the location of the calibration feature is known within a captured image of the calibration image source. An image of the calibration image source can then be captured by the panoramic optical device, producing a calibration image in a quadric format. Coordinates for a visual image center of the calibration image can be determined by an image center calibration program using the location of the calibration feature contained in the captured calibration image. The visual image center can be the point in the calibration image around which the quadric format is rotated and flattened into a visually-correct panoramic format. The visual image center for images captured by the panoramic optical device can shift over time as a result of installation/removal, repeated use, parts replacement, and/or environmental stressors. The determined visual image center coordinates can be stored for subsequent use to transform captured quadric images into panoramic images, replacing any pre-existing set of visual image center coordinates.

Another aspect of the disclosure describes a system for calibrating a panoramic optical device. Such a system can include a panoramic optical device, a calibration image source, a set of image center coordinates, and an image center calibration software program. The panoramic optical device can be configured to capture a panoramic image. The panoramic optical device can further include a quadric reflector, a mirror, a set of one or more optical elements, and an image sensor. The quadric reflector can have a conical shape, which tapers from a wide base to an apex having an aperture. The mirror can be positioned within the panoramic optical device in a plane approximately parallel to a circular cross-section of the quadric reflector to reflect environmental light reflected by the quadric reflector into the aperture of the quadric reflector. The set of optical elements can be positioned at least partially within a volumetric region of the quadric reflector to focus light passing through the aperture. The image sensor can convert an optical image into an electronic signal. The optical image can result from the environmental light reflecting off the quadric reflector, reflecting off the mirror, passing through the aperture, being focused by the set of one or more optical elements, to be received by the image sensor. The calibration image source can have a size and shape allowing circumferential enclosure of an external space substantially proximate to the quadric reflector of the panoramic optical device. The panoramic optical device can capture a calibration image of the calibration image source. The calibration image source can be made of a material that is substantially transparent so as to allow environmental light to pass through the calibration image source for reflection by the quadric reflector and can utilize a predetermined color palette. The surface of the calibration image source that faces the external surface of the quadric reflector can include a calibration feature that is a geometric shape and/or a line. The calibration feature can be in a known location within the calibration image. The set of image center coordinates can be stored within a persistent memory of the panoramic optical device. The set of image center coordinates can represent the visual center of the quadric image captured by the panoramic optical device and can be used to transform the quadric image into a visually-correct panoramic image. The image center calibration software program can be configured to automatically verify an accuracy of the set of image center coordinates using the calibration image captured from the calibration image source.

Yet another aspect of the present invention can include a computer program product that includes a computer readable storage medium having embedded computer usable program code. The computer usable program code can be configured to, upon receipt of a calibration image captured in a quadric format by a panoramic optical device that utilizes a quadric reflector having a conical shape and an aperture in its apex, determine coordinates for a visual image center of the calibration image using a location of a calibration feature contained in the captured calibration image. The visual image center can be the point in the calibration image around which the quadric format is rotated and flattened into a visually-correct panoramic format. The relationship between the location of the calibration feature and the visual image center can be known. The calibration feature can be a geometric shape and/or a line. The calibration feature can be in a known location within a source of the calibration image, and, therefore, the location of the calibration feature can be known within the calibration image. The computer usable program code can be configured to store the determined visual image center coordinates for subsequent use to transform captured quadric images into panoramic images, replacing a pre-existing set of visual image center coordinates.

DETAILED DESCRIPTION

The present disclosure is a solution for calibrating a panoramic optical device. The panoramic device can utilize a quadric reflector (e.g., a parabolic, hyperbolic, or elliptical mirror) having an aperture within its apex. Light is reflected off the quadric reflector to a mirror, which reflects the light through the aperture. An image sensor on an opposite side of the aperture from the mirror receives and processes the reflected light. A calibration image source can be positioned upon/around the panoramic optical device to allow capture of a calibration image. An image center calibration program can then use the calibration image to determine coordinates for the visual image center of the calibration image. The determined visual image center coordinates can be used to transform images from the original quadric format into the panoramic format.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a client device, partly on the client device, as a stand-alone software package, partly on the client device and partly on a remote computer or entirely on the remote computer or server. In the latter scenario, the remote computer may be connected to the client device through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
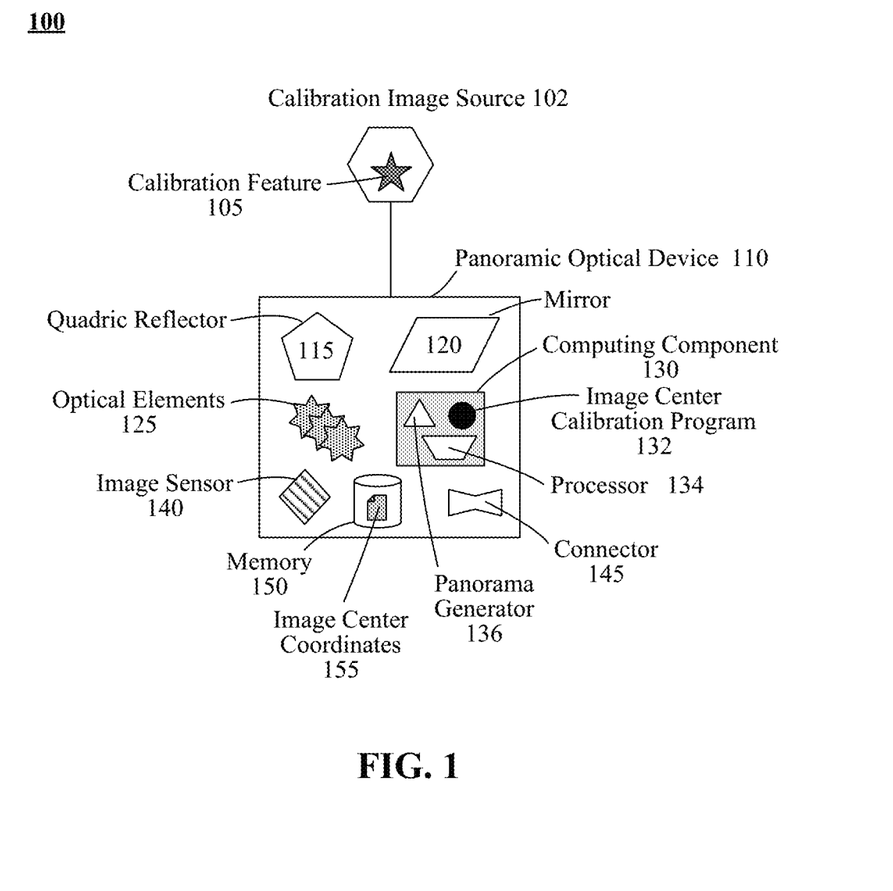
FIG. 1 is a functional block diagram illustrating a system for calibrating a panoramic optical device in accordance with embodiments of the inventive arrangements disclosed herein.

FIG. 1 is a functional block diagram illustrating a system 100 for calibrating a panoramic optical device 110 in accordance with embodiments of the inventive arrangements disclosed herein. In system 100, the panoramic optical device 110 can be calibrated using a calibration image source 102.

The calibration image source 102 can represent a variety of prepared or approved items that can be used in conjunction with the panoramic optical device 110 for calibration purposes. The specific embodiment of the calibration image source 102 used can be based upon the corresponding embodiment and/or type of panoramic optical device 110. That is, the size, shape, and material of the calibration image source 102 can be such to work with the specific panoramic optical device 110. Further, the calibration image source 102 can utilize a known color palette (i.e., black and white).

For example, the calibration image source 102 can be meant to encompass the panoramic optical device 110 so a calibration image (not shown) can be captured. Therefore, the calibration image source 102 can be designed to properly encapsulate the image capturing portion of the panoramic optical device 110 and to allow the passage of enough light for image capture.

The calibration image source 102 can include one or more calibration features 105. A calibration feature 105 can be a geometric shape and/or line. The location, or a key location indicator (e.g., equation of the line, vertical boundaries of the shape, etc.) of the calibration feature 105 within the calibration image source 102 can be known.

It should be noted that, while system 100 and the Figures discuss a quadric-type panoramic optical device 110, other types of panoramic optical devices 110 can be used in conjunction with the techniques taught herein with minor modification and without departing from the spirit of the present invention.

The panoramic optical device 110 can be an electronic device configured to capture a 360-degree image of the surrounding area. The panoramic optical device 110 may be implemented as a stand-alone device or as a peripheral device. The panoramic optical device 110 can have a variety of configurations that utilize different sets of components. Therefore, the panoramic optical device 110 shown in system 100 can be meant to highlight those elements of particular note for the present invention.

The panoramic optical device 110 can include a quadric reflector 115, a mirror 120, a set of optical elements 125, a computing component 130, an image sensor 140, a connector 145, and memory 150 to store image center coordinates 155. The quadric reflector 115 can be a reflective conical surface, which may be a parabolic surface, a hyperbolic surface, a hemispherical surface, or an elliptic surface. The quadric reflector 115 can be the surface that reflects environmental light into the mirror 120.

The mirror 120 can be used to reflect the light into the optical elements 125. The optical elements 125 can represent a variety of components that focus the reflected light onto the image sensor 140. A misalignment of one or more optical elements 125 can result in the light hitting the image sensor 140 "off-center", which results in a panoramic image that is visually-incorrect (i.e., warped, twisted, incongruent, etc.). A user of the panoramic optical device 110 would not be aware of the misalignment until images were viewed. Further, rectifying the misalignment would require manually identifying the misaligned optical element 125 and adjusting the seating of that element 125; tasks that can exceed the capabilities of the typical user as well as be very time-consuming for a skilled technician.

The optical elements 125 may also filter undesired optical wavelengths, correct for color aberrations that would otherwise cause different colors to focus at different planes and positions, and/or ensure despite distortions from the quadric reflector 115 that the optical image substantially lays on a flat focal plane. In one embodiment, positive elements of the optical elements 125 can be made from polymethyl methacrylate (PMMA, or acrylic), other transparent thermoplastic, glass, or other suitable substances. Negative ones of the optical elements 125 can be made of polycarbonate, other thermoplastic polymers, or other suitable substances.

The image sensor 140 can be the component that converts an optical image into an electronic signal. Any of a variety of technologies can be for the image sensor 140 including, but not limited to, semiconductor charge-coupled devices (CCD), active pixel sensors in complementary metal-oxide-semiconductor (CMOS), and N-type metal-oxide-semiconductor (NMOS, Live MOS) technologies.

Connector 145 can represent a means for electronically coupling the panoramic optical device 110 to another electronic device or component. Multiple connectors 145 can be used to support multiple types of connections.

The computing component 130 can represent the hardware and software required to store and execute machine-readable instructions. The computing component 130 can include one or more processors 134, the image center calibration software program 132, herein referred to as the image center calibration program 132, and a panorama generator 136 software program. In other contemplated embodiments, the computing component 130 can include support for user input elements (e.g., buttons, a touchscreen, a microphone for receiving voice input, an on/off switch), user output elements (e.g., a small screen, status buttons, power level indicator, etc.), and a network transceiver or other communication component (such as a communication bus).

The processor 134 can be the hardware and/or software elements required to execute the image center calibration program 132 and panorama generator 136. The processor 134 can be such to adequately support execution of these programs 132 and 136.

The image center calibration program 132 can be a software program designed to analyze an image captured of the calibration image source 102 to determine its visual image center. The image center calibration program 132 can eliminate the need for manual adjustment of the misaligned optical elements 125, in cases where the deviation of the visual image center is within a correctable threshold. When necessary, the image center calibration program 132 can replace the image center coordinates 155 currently stored within non-volatile (i.e., persistent) memory 150. The image center calibration program 132 can be written in a programming language appropriate for the processor 134 and storage requirements of the computing component 130.

The panorama generator 136 can be a software program that transforms the captured image into a panorama based upon the image center coordinates 155. The panoramic optical device 110 of system 100 can capture images in a quadric format due to the surface shape of the quadric reflector 115. The image center coordinates 155 can, therefore, represent the point around which the quadric format is rotated and flattened (i.e., unraveled) into a panorama, as is known in the Art.

In another embodiment, the computing component 130 can be a secondary device coupled to the panoramic optical device 110 via the connector 145. In yet another embodiment, memory 150 can be an element of the computing component 130 and can store the machine-readable instructions of the image center calibration program 132 and/or panorama generator 136.

Figure 2:
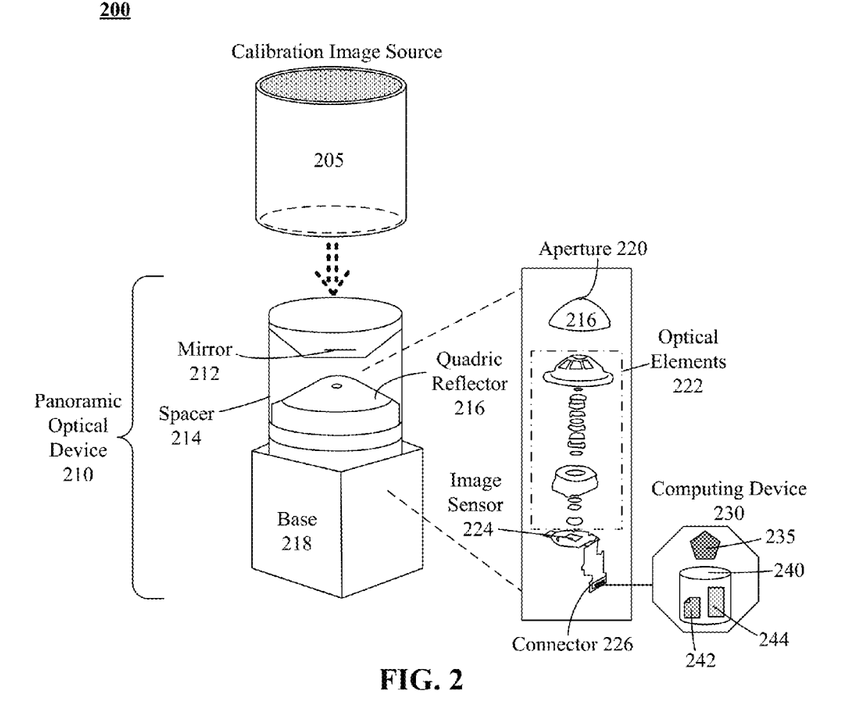
FIG. 2 is a schematic diagram of a system depicting a detailed example embodiment of the calibration image source and the panoramic optical device in accordance with embodiments of the disclosure.

FIG. 2 is a schematic diagram of a system 200 depicting a detailed example embodiment of the calibration image source 205 and the panoramic optical device 210 in accordance with embodiments of the disclosure. As shown in system 200, the calibration image source 205 can be a tube capable of being placed over/around the image capturing portion of the panoramic optical device 210. In other embodiments, particularly where gravity or other environmental factors can affect placement of the calibration image source 205, the calibration image source 205 and/or panoramic optical device 210 can also include a means for securing the calibration image source 205 during the calibration process like a snap or latch.

The panoramic optical device 210 can be a unit whose components are enclosed by a spacer 214 and a base 218. The base 218 can be made of a suitably durable material and can be used to install the panoramic optical device 210 at a specific location. Connected to the base can be the spacer 214 that is made of a suitable transparent material. The spacer 214 can surround the quadric reflector 216 and the mirror 212. The spacer 214 can support the mirror 212 in a position substantially parallel to the cross-section of the quadric reflector 216 at a distance that ensures light reflected by the quadric reflector 216 is reflected off the mirror 212 and into an aperture 220 in the quadric reflector 216.

The quadric reflector 216 can be a non-degenerate real quadratic surface that tapers from a wide base towards an apex, where the aperture 220 is positioned. Light can be reflected off of the mirror 212, through the aperture 220 to the optical elements 222. The column of optical elements 222 can manipulate and focus the light upon the image sensor 224.

In this example embodiment, connector 226 can couple the image sensor 224 with an external computing device 230. The computing device 230 can include a processor 235 and memory 240 storing the image center coordinates 242 and software programs 244. In another embodiment, computing device 230 can be housed within the base 218 of the panoramic optical device 210.

Figure 2A:
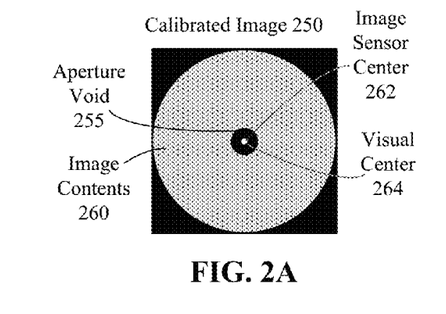
FIG. 2A shows a calibrated image.

With the calibration image source 205 affixed, the panoramic optical device 210 can capture an image. This captured image can be in a quadric format and can look like one of the images 250 and 270 shown in FIGS. 2A and 2B. When the components (mirror 212, quadric reflector 216, and optical elements 222) of the panoramic optical device 210 are properly aligned and/or calibrated, the panoramic optical device 210 can capture a calibrated image 250, as shown in FIG. 2A.

In a calibrated image 250, the image contents 260 (i.e., the environmental features) can appear in an exaggerated, circular format that is in accordance with the specific quadric surface of the quadric reflector 216. A circular "blank" space can exist in the center of the image contents 260 that can correspond to the aperture void 255. That is, the aperture 220 in the surface of the quadric reflector 216 translates as a corresponding void 255 in the calibrated image 250.

Because the panoramic optical device 210 has been calibrated, the visual center 264 of the image contents 260 can be aligned with the image sensor center 262. The image sensor center 262 can be the point in the calibrated image that corresponds to the physical center of the image sensor 224. Ideally, the image sensor center 262 should be the visual center 264. The visual center 264 can be a general reference to the image center coordinates 242. Thus, the visual center 264 is the point of the calibrated image 250 that produces a visually-correct panorama.

Since the panoramic optical device 210 is comprised of many high-precision components, changes in the alignment of these components over time can naturally occur due to environmental factors like wind and vibration or can be inadvertently introduced through parts replacement, use, or damage. Over time, therefore, the calibrated image 250 can become the misaligned image 270 of FIG. 2B.

Figure 2B:
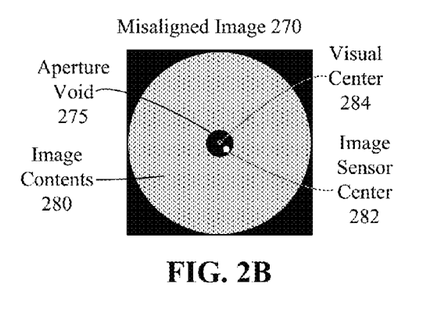
FIG. 2B shows a misaligned image.

Visually, the calibrated image 250 and the misaligned image 270 can look identical. Both images 250 and 270 can have circular image contents 260 and 280 having a central aperture void 255 and 275. The visual center 264 and 284 of each image 250 and 270 can be in the center of the aperture void 255 and 275. However, in the misaligned image 270, the image sensor center 282 can be out of alignment with the visual center 284. This can be of great importance as the image sensor center 282 is typically used when transforming a quadric image into its corresponding panorama. Thus, a panorama created from the misaligned image 270 can be visually unappealing; the image contents 280 can be warped and incongruent. The image center calibration program can be used to resolve the misalignment of the image sensor center 282 with the visual center 284 of the misaligned image 270.

Figure 3:
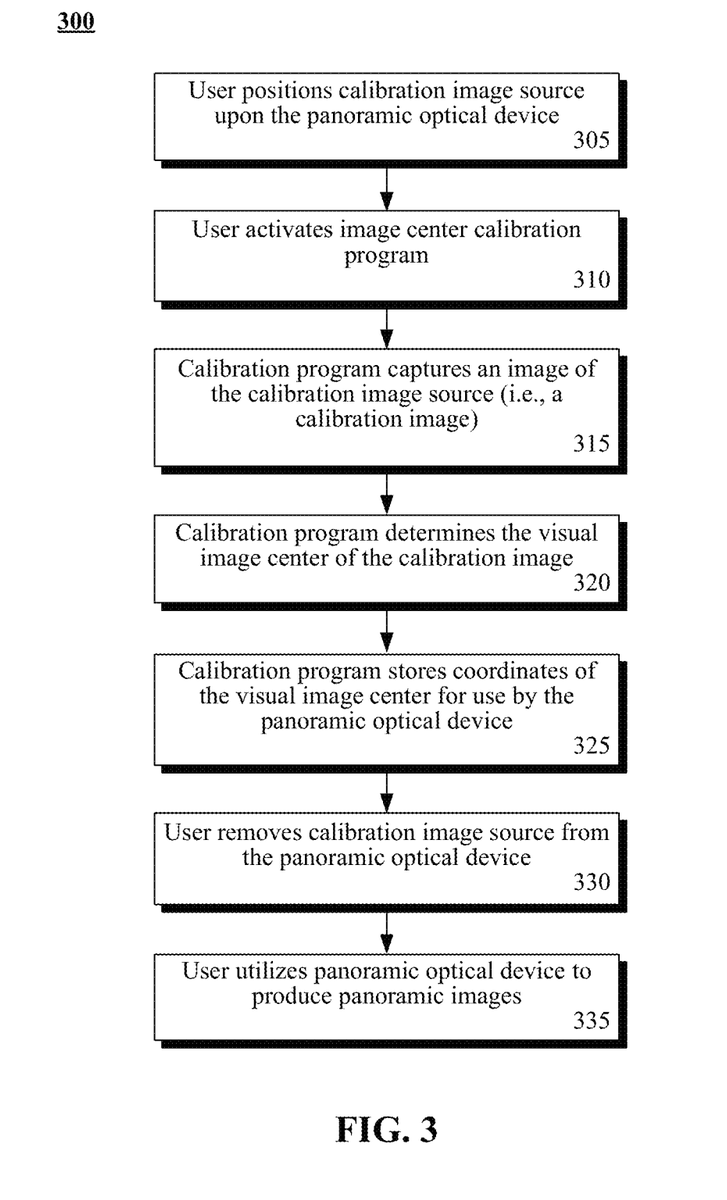
FIG. 3 is a flow chart of a method describing the general calibration process for the panoramic optical device in accordance with embodiments of the disclosure.

FIG. 3 is a flow chart of a method 300 describing the general calibration process for the panoramic optical device in accordance with embodiments of the disclosure. Method 300 can be performed within the context of systems 100 and/or 200.

Method 300 can begin in step 305, where the user can position the calibration image source upon the panoramic optical device. Step 305, when applicable, can include securing the calibration image source to the panoramic optical device. The user can activate the image center calibration program in step 310.

In step 315, the image center calibration program can trigger the panoramic optical device to capture an image of the calibration image source, herein referred to as a calibration image. The image center calibration program can determine the visual image center in step 320. In step 325, the image center calibration program can store the coordinates of the visual image center for use by the panoramic optical device.

The user can remove the calibration image source from the panoramic optical device, upon completion of the image center calibration program, in step 330. In step 335, the user can then proceed to use the panoramic optical device to produce panoramic images.

Figure 4:
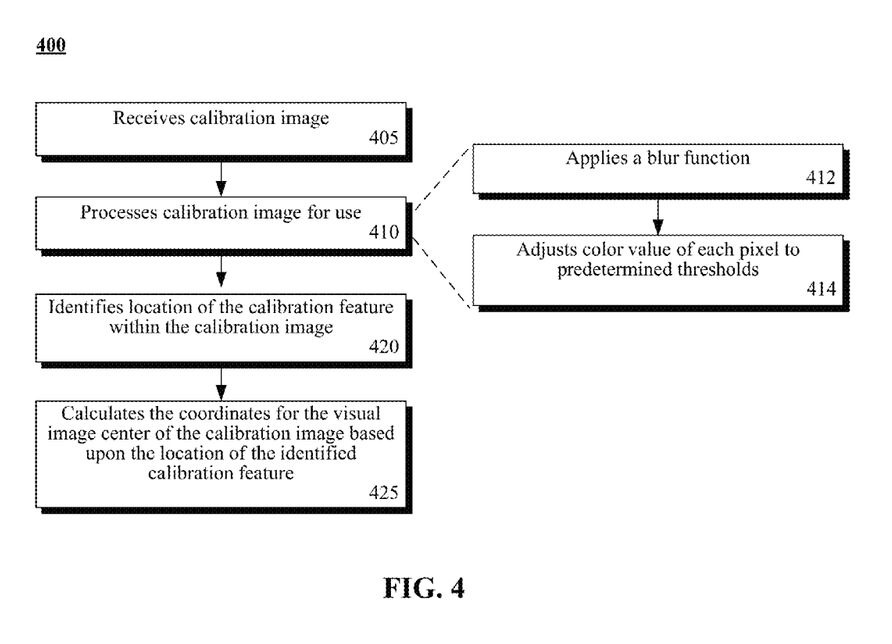
FIG. 4 is a flow chart of a method detailing the operation of the image center calibration program in accordance with embodiments of the disclosure.

FIG. 4 is a flow chart of a method 400 detailing the operation of the image center calibration program in accordance with embodiments of the disclosure. Method 400 can be performed within the context of systems 100 and/or 200.

Method 400 can begin in step 405 wherein the image center calibration program can receive the calibration image. The calibration image can be processed for use in step 410. Step 410 can enhance the appearance of the calibration feature in the calibration image.

As such, step 410 can be comprised of step 412 that applies a blur function to the calibration image. Application of a blur function in step 412 can help to remove small and/or inconsequential artifacts from the calibration image. These artifacts can be items introduced by the environment like dust, shadows, or imperfections in the calibration image source due to breakage, dirtiness, or misalignment.

After application of the blur function, the color value of each pixel can be adjusted to predetermined thresholds in step 414. As previously mentioned, the calibration image source can utilize a known color palette. Step 414 can, essentially, enforce adherence to that color palette. For example, with a calibration image source having a black and white color palette, step 414 can change grey pixels to either black or white, depending on their color value (i.e., darker grey pixels are set to black, light grey to white).

Once the calibration image has been processed for use, the location of the calibration feature can be identified within the calibration image in step 420. In step 425, the coordinates for the visual image center of the calibration image can be calculated based upon the location of the identified calibration feature. The approach used to perform step 425 can vary based upon the calibration feature used.

Figure 5:
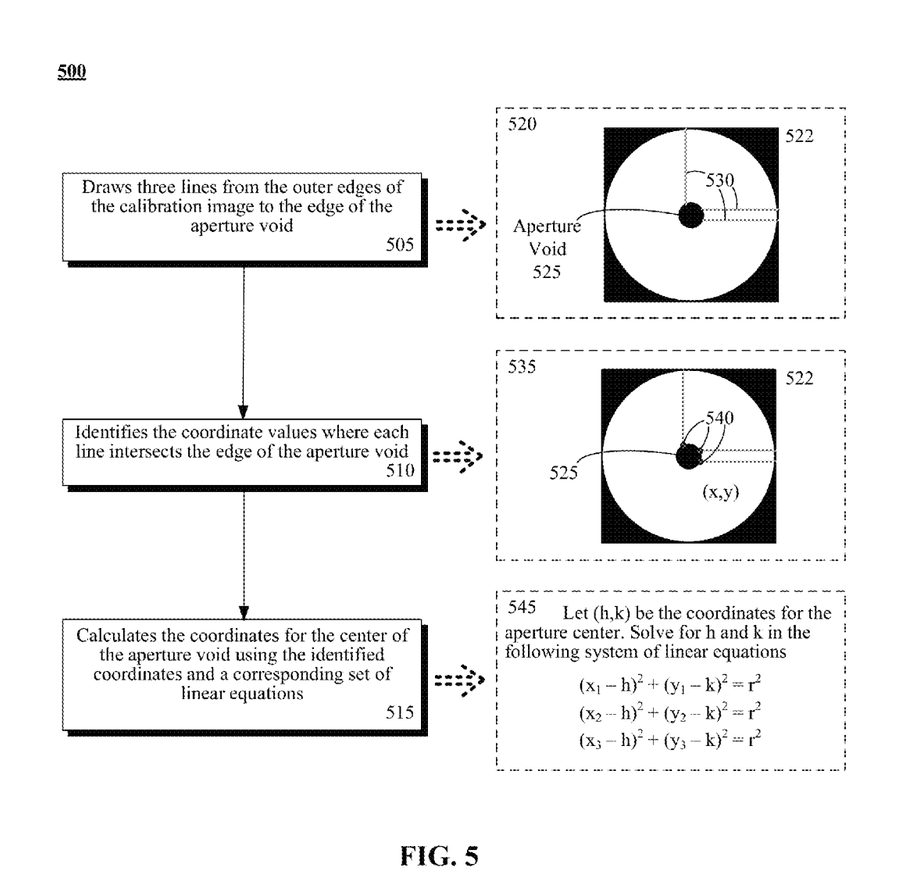
FIG. 5 is an illustrated flow chart of a method describing the calculation of the visual image center coordinates using the aperture void as the calibration feature in accordance with embodiments of the disclosure.

FIG. 5 is an illustrated flow chart of a method 500 describing the calculation of the visual image center coordinates using the aperture void 525 as the calibration feature in accordance with embodiments of the disclosure. Method 500 can represent a specific embodiment of step 425 of method 400.

Method 500 can begin in step 505 where three lines 530 can be drawn from the outer edges of the calibration image 522 to the edge of the aperture void 525, as shown in illustration 520. The coordinate values 540 where each line 530 intersects the edge of the aperture void 525 can be identified in step 510 and presented in illustration 535. In step 515, the coordinates for the center of the aperture void 525 can be calculated using the identified coordinates 540 and the corresponding set of linear equations shown in illustration 545.

Figure 6:
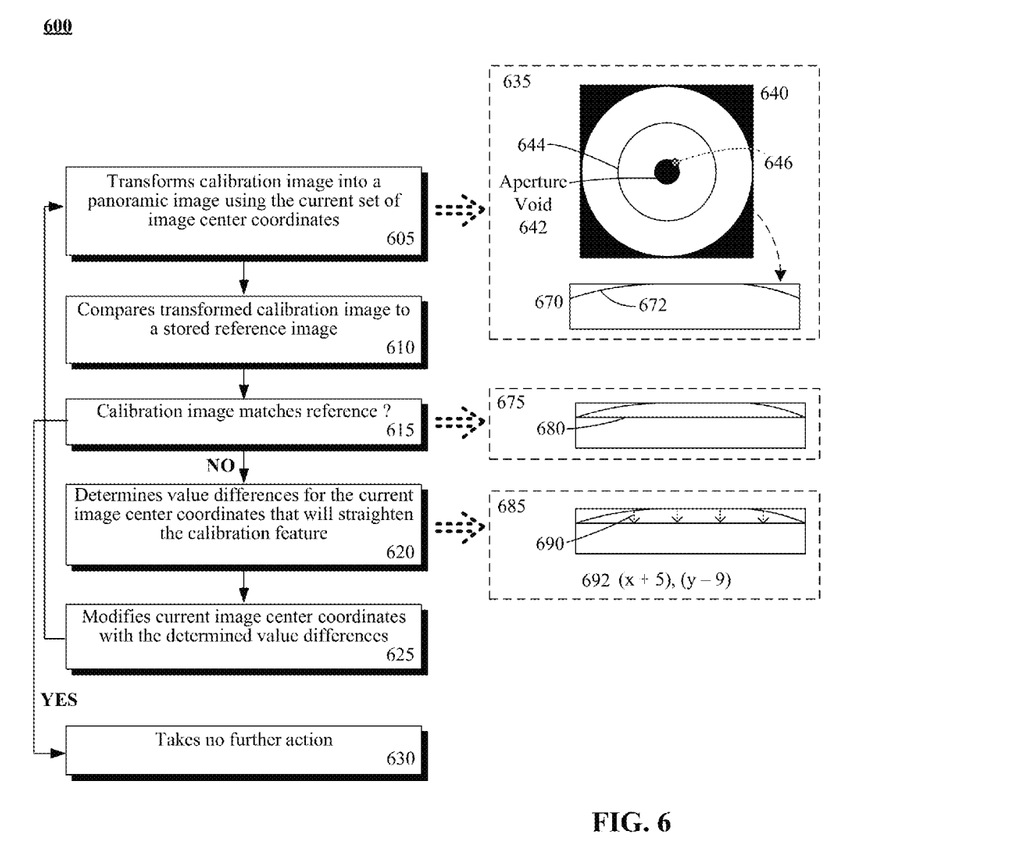
FIG. 6 is an illustrated flow chart of a method describing an alternate means for calculating the visual image center coordinates using a straight line as the calibration feature and a reference image in accordance with embodiments of the disclosure.

FIG. 6 is an illustrated flow chart of a method 600 describing an alternate means for calculating the visual image center coordinates using a straight line 644 as the calibration feature and a reference image 680 in accordance with embodiments of the disclosure. Method 600 can represent a specific embodiment of step 425 of method 400.

Method 600 can begin with step 605 where the calibration image 640 can be transformed into a panoramic image 670 using the current set of image center coordinates 646, as shown in illustration 635. In illustration 635, the calibration image 640 can use a straight line calibration feature 644, which can look like a circle or ellipse in the quadric format. The current set of image center coordinates 646 can be off-center from the aperture void 642. This can result in the calibration feature 644 appearing as a curve 672 in the transformed panoramic image 670.

As shown in illustration 675 and described in step 610, the transformed calibration image 670 can be compared with a stored reference image 680. The reference image 680 can show that the calibration feature 644 as its expected straight line. It can be determined if the calibration image 670 matches the reference image 680 in step 615.

When the calibration 670 and reference 680 images match, step 630 can be performed where no further action is needed by the image center calibration program. When the calibration image 670 does not match the reference image 680, step 620 can execute where value differences 692 for the current image center coordinates 646 can be determined that will straighten the calibration feature 644. As shown in illustration 685, one or more mathematical operations 690 can be performed upon the calibration feature 644 to obtain the values 692 to modify the image center coordinates 646.

Upon completion of step 620, the current image center coordinates 646 can be modified with the determined value differences 692 in step 625. From step 625, flow of method 600 can return to step 605 to re-process the calibration image 640 with the modified set of image center coordinates to verify the accuracy of the modifications.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
    positioning of a calibration image source around and proximate to an exterior surface of a panoramic optical device that utilizes a quadric reflector having a conical shape and an aperture in its apex, wherein the calibration image source is made of a material that is substantially transparent so as to allow environmental light to pass through the calibration image source and utilize a predetermined color palette, wherein a surface of the calibration image source that faces the panoramic optical device includes a calibration feature, wherein the calibration feature comprises at least one of a geometric shape and a line, wherein the calibration feature is in a known location within the calibration image source, and, therefore, the location of the calibration feature is known within a captured image of the calibration image source;

capturing of an image of the calibration image source by the panoramic optical device, wherein the captured image is a calibration image in a quadric format;

determining of coordinates for a visual image center of the calibration image using the location of the calibration feature contained in the captured calibration image by an image center calibration program, wherein the visual image center is a point in the calibration image around which the quadric format is rotated and flattened into a visually-correct panoramic format, wherein the visual image center for images captured by the panoramic optical device shifts over time as a result of at least one of installation/removal, repeated use, parts replacement, and environmental stressors; and storing the determined visual image center coordinates for subsequent use to transform captured quadric images into panoramic images, wherein a pre-existing set of visual image center coordinates is replaced.

2. The method of claim 1, further comprising:
removing of the calibration image source from the position around and proximate to the exterior surface of the panoramic optical device, wherein the panoramic optical device is ready for general use.

3. The method of claim 1, wherein determining the coordinates of the visual image center further comprises:
performing at least one image processing function upon the calibration image to enhance an appearance of the calibration feature;
identifying the location of the calibration feature within the calibration image;
comparing the identified location of the calibration feature with the known location of the calibration feature; and
when the identified location varies from the known location by more than a predetermined threshold, calculating the coordinates of the visual image center of the calibration image using a relationship between the known location of the calibration feature and the visual image center.

4. The method of claim 3, wherein the at least one image processing function comprises at least one of a filtering function, a color adjustment function, a masking function, an edge detection function, a smoothing function, an equalization function, and a gamma correction function.

5. The method of claim 3, wherein, when the calibration feature is a circular void created by the aperture in the quadric reflector of the panoramic optical device, the comparing of the identified location is omitted and the calculating of the visual image center coordinates further comprises:
drawing three distinct straight lines from outer edges of the calibration image to an edge of the circular void;
identifying a set of coordinate values for each straight line where each straight line touches the edge of the circular void, wherein each set of coordinate values lies upon a circumference of the circular void;
generating a set of three linear equations, wherein each linear equation represents a corresponding set of identified coordinate values, wherein each linear equation is of a format $$(x-h)^2+(y-k)^2=r^2,$$

wherein x and y correspond to the set of identified coordinate values, h and k represent coordinates for a center point of the circular void, and r is a radius of the circular void; and
solving the set of three linear equations to produce values for the center point of the circular void, h and k, wherein the center point of the circular void is the visual image center.

6. The method of claim 3, wherein, prior to the performing of the at least one image processing function, said method further comprises:
transforming the calibration image from the quadric format into the panoramic format, wherein the comparing of the identified location of the calibration feature further comprises:
accessing a reference image for the calibration image source, wherein the reference image is an image depicting the known location of the calibration feature; and
overlaying the calibration image upon the reference image.

7. The method of claim 6, wherein the calculating of the coordinates further comprises:
from the overlay of the calibration image upon the reference image, determining a difference in value for an x-coordinate and a y-coordinate of the calibration feature, wherein said value differences, when applied to the corresponding coordinates of the visual image center, result in an alignment of the calibration feature in the calibration image with the calibration feature in the reference image.

8. A system for calibrating a panoramic optical device comprising:
a panoramic optical device configured to capture a panoramic image, said panoramic optical device further comprising:
a quadric reflector having a conical shape, which tapers from a wide base to an apex, said apex comprising an aperture;
a mirror positioned within the panoramic optical device in a plane parallel to a circular cross section of the conical shape, said mirror reflecting environmental light that is reflected by the quadric reflector into the aperture;
a set of one or more optical elements positioned at least partially within a volumetric region of the quadric reflector, said one or more optical elements focusing light passing through the aperture;
an image sensor for converting an optical image into an electronic signal, said optical image resulting from the environmental light reflecting off the quadric reflector, reflecting off the mirror, passing through the aperture, being focused by the set of one or more optical elements, to be received by the image sensor;
a calibration image source having a size and shape allowing circumferential enclosure of an external space proximate to the quadric reflector of the panoramic optical device, wherein the panoramic optical device is able to capture a calibration image of the calibration image source, wherein the calibration image source is made of a material that is substantially transparent so as to allow environmental light to pass through the calibration image source for reflection by the quadric reflector and utilizes a predetermined color palette, wherein a surface of the calibration image source that faces an external surface of the quadric reflector includes a calibration feature, wherein the calibration feature comprises at least one of a geometric shape and a line, wherein the calibration feature is in a known location within the calibration image;
a set of image center coordinates stored within a persistent memory of the panoramic optical device, wherein said set of image center coordinates represent a visual center of a quadric image captured by the panoramic optical device, wherein the set of image center coordinates are used to transform the quadric image into a visually-correct panoramic image; and
an image center calibration software program configured to automatically verify an accuracy of the set of image center coordinates using the calibration image captured from the calibration image source.

9. The system of claim 8, wherein, when the image center calibration program is externally-located from the panoramic optical device, said system further comprising:
a computing device configured to store and execute the image center calibration program, wherein said computing device is communicatively connected to the panoramic optical device.

10. The system of claim 8, wherein the panoramic optical device further comprises:
a computing component configured to execute the image center calibration program, wherein said image center calibration program is stored within the persistent memory of the panoramic optical device.

11. The system of claim 8, wherein the calibration feature is a circular void created by the aperture in the quadric reflector of the panoramic optical device.

12. The system of claim 8, wherein, when the calibration feature is a line defined by a known equation.

13. The system of claim 12, further comprising:
a reference image of the calibration image source accessible by the image center calibration software program, wherein the reference image graphically depicts the line, wherein the image center calibration software program tests a linearity of the line in the captured calibration image against the line depicted in the reference image.

14. The system of claim 8, wherein the material comprising the calibration image source is one of plastic, acrylic, paper, glass, styrofoam, nylon, polycarbonate, and resin.

15. The system of claim 8, further comprising:
at least one image processing algorithm configured to perform an image processing function upon the calibration image, wherein the image processing function comprises one of a filtering function, a color adjustment function, a masking function, an edge detection function, a smoothing function, an equalization function, and a gamma correction function.

16. A computer program product comprising a non-transitory computer readable storage medium having computer usable program code embodied therewith, the computer usable program code comprising:
computer usable program code configured to, upon receipt of a calibration image captured in a quadric format by a panoramic optical device that utilizes a quadric reflector having a conical shape and an aperture in its apex, determine coordinates for a visual image center of the calibration image using a location of a calibration feature contained in the captured calibration image, wherein the visual image center is a point in the calibration image around which the quadric format is rotated and flattened into a visually-correct panoramic format, wherein a relationship between the location of the calibration feature and the visual image center is known, wherein the calibration feature comprises at least one of a geometric shape and a line, wherein the calibration feature is in a known location within a source of the calibration image, and, therefore, the location of the calibration feature is known within the calibration image; and
computer usable program code configured to store the determined visual image center coordinates for subsequent use to transform captured quadric images into panoramic images, wherein a pre-existing set of visual image center coordinates is replaced.

17. The computer program product of claim 16, wherein determining the coordinates of the visual image center further comprises:
computer usable program code configured to perform at least one image processing function upon the calibration image to enhance an appearance of the calibration feature;
computer usable program code configured to identify the location of the calibration feature within the calibration image;
computer usable program code configured to compare the identified location of the calibration feature with the known location of the calibration feature; and
computer usable program code configured to, when the identified location varies from the known location by more than a predetermined threshold, calculate the coordinates of the visual image center of the calibration image using the relationship between the known position of the calibration feature and the visual image center.

18. The computer program product of claim 17, wherein, when the calibration feature is a circular void created by the aperture in the quadric reflector of the panoramic optical device, the comparing of the identified location is omitted and the calculating of the visual image center coordinates further comprises:
computer usable program code configured to draw three distinct straight lines from outer edges of the calibration image to an edge of the circular void;
computer usable program code configured to identify a set of coordinate values for each straight line where each straight line touches the edge of the circular void, wherein each set of coordinate values lies upon a circumference of the circular void;
computer usable program code configured to generate a set of three linear equations, wherein each linear equation represents a corresponding set of identified coordinate values, wherein each linear equation is of a format $$(x-h)^2+(y-k)^2=r^2,$$

wherein x and y correspond to the set of identified coordinate values, h and k represent coordinates for a center point of the circular void, and r is a radius of the circular void; and
computer usable program code configured to solve the set of three linear equations to produce values for the center point of the circular void, h and k, wherein the center point of the circular void is the visual image center.

19. The computer program product of claim 17, wherein, prior to the performing of the at least one image processing function, said computer program product further comprises:
computer usable program code configured to transform the calibration image from the quadric format into the panoramic format, wherein the comparing of the identified location of the calibration feature further comprises:
  computer usable program code configured to access a reference image for the calibration image, wherein the reference image is an image depicting the known location of the calibration feature; and
  computer usable program code configured to overlay the calibration image upon the reference image.

20. The computer program product of claim 19, wherein the calculating of the coordinates further comprises:
  computer usable program code configured to, from the overlay of the calibration image upon the reference image, determine a difference in value for an x-coordinate and a y-coordinate of the calibration feature, wherein said value differences, when applied to the corresponding coordinates of the visual image center, result in an alignment of the calibration feature in the calibration image with the calibration feature in the reference image.

* * * * *